United States Patent
Cognata et al.

(10) Patent No.: US 11,759,736 B2
(45) Date of Patent: *Sep. 19, 2023

(54) TWO-PHASE SEPARATOR DEVICE FOR REMOVING CONDENSATE OR PARTICULATE FROM A GAS STREAM

(71) Applicant: Paragon Space Development Corporation, Tucson, AZ (US)

(72) Inventors: Thomas Cognata, Houston, TX (US); Brittany Lynn Zimmerman, Tucson, AZ (US)

(73) Assignee: Paragon Space Development Corporation, Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,863

(22) Filed: Aug. 2, 2022

(65) Prior Publication Data

US 2022/0379252 A1    Dec. 1, 2022

Related U.S. Application Data

(63) Continuation of application No. 16/948,052, filed on Aug. 28, 2020, now Pat. No. 11,433,337.

(Continued)

(51) Int. Cl.
*B01D 45/14* (2006.01)
*B01D 45/04* (2006.01)
(Continued)

(52) U.S. Cl.
CPC .............. *B01D 45/14* (2013.01); *B01D 45/04* (2013.01); *B01D 45/18* (2013.01); *B01D 47/06* (2013.01); *B01D 50/40* (2022.01)

(58) Field of Classification Search
CPC ........ B01D 45/14; B01D 45/04; B01D 45/18; B01D 47/06; B01D 50/40; B01D 19/0052;
(Continued)

(56) References Cited

U.S. PATENT DOCUMENTS 2,453,593 A    11/1948    Putney
3,853,515 A    12/1974    Davis
(Continued)

FOREIGN PATENT DOCUMENTS

CN    202538525 U    11/2012
CN    206823365 U     1/2018

OTHER PUBLICATIONS

International Preliminary Report on Patentability dated Dec. 20, 2021, for International Application No. PCT/US2020/048548.
(Continued)

*Primary Examiner* — Dung H Bui
(74) *Attorney, Agent, or Firm* — Weaver Austin Villeneuve & Sampson LLP

(57) ABSTRACT

This disclosure provides a two-phase separator device for separating condensate or particulate from a gas stream. In some implementations, the separator device removes water from air and may operate under micro-gravity conditions. The gas stream flows through the two-phase separator device and passes through a rotatable vane assembly along a flow path without being redirected in another flow path. Condensate or particulate in the gas stream is impacted by a plurality of vanes of the rotatable vane assembly, and the condensate is captured by features formed within the plurality of vanes. The captured condensate is accelerated radially outwardly along the each of the plurality of vanes towards a sloped inner wall, and further moved along the sloped inner wall in a direction against the flow path of the gas stream during rotation.

15 Claims, 10 Drawing Sheets

Related U.S. Application Data

(60) Provisional application No. 62/894,504, filed on Aug. 30, 2019.

(51) Int. Cl.
  *B01D 45/18* (2006.01)
  *B01D 47/06* (2006.01)
  *B01D 50/40* (2022.01)

(58) Field of Classification Search
  CPC ..... B04B 2001/2041; B04B 3/04; B04B 5/08; B04B 5/12; B04B 2005/125; B04B 11/08; B04B 11/082
  See application file for complete search history.

(56) References Cited

U.S. PATENT DOCUMENTS

| | | | |
|---|---|---|---|
| 3,885,734 A * | 5/1975 | Lee | B04B 1/20 |
| | | | 494/56 |
| 3,915,673 A | 10/1975 | Tamai et al. | |
| 4,594,166 A * | 6/1986 | Clinton | B04B 15/06 |
| | | | 494/35 |
| 5,087,127 A * | 2/1992 | Knelson | B04B 11/08 |
| | | | 494/80 |
| 5,182,031 A | 1/1993 | Lamort | |
| 5,716,423 A | 2/1998 | Krul et al. | |
| 5,755,096 A | 5/1998 | Holleyman | |
| 6,939,286 B1 | 9/2005 | Hurdlow | |
| 7,527,587 B2 * | 5/2009 | Laughlin | B04B 5/10 |
| | | | 494/67 |
| 8,079,805 B2 | 12/2011 | Maier | |
| 11,433,337 B2 | 9/2022 | Cognata et al. | |
| 2006/0096461 A1 | 5/2006 | Kim et al. | |
| 2006/0096933 A1 | 5/2006 | Maier | |
| 2007/0256398 A1 | 11/2007 | Barone et al. | |
| 2007/0289632 A1 | 12/2007 | Della Casa | |
| 2009/0266231 A1 | 10/2009 | Franzen et al. | |
| 2009/0321343 A1 | 12/2009 | Maier | |
| 2010/0038309 A1 | 2/2010 | Maier | |
| 2011/0220591 A1 | 9/2011 | Maier et al. | |
| 2012/0067788 A1 | 3/2012 | Boele | |
| 2013/0327725 A1 | 12/2013 | Kumar et al. | |
| 2016/0138444 A1 | 5/2016 | Prunera-Usach et al. | |
| 2016/0305440 A1 | 10/2016 | Laboda et al. | |
| 2017/0120176 A1 * | 5/2017 | Ishida | B01D 45/14 |
| 2017/0197164 A1 | 7/2017 | Seeley | |
| 2018/0117512 A1 | 5/2018 | Janakiraman et al. | |
| 2018/0119617 A1 | 5/2018 | Pulter et al. | |
| 2018/0169556 A1 | 6/2018 | Parikh et al. | |
| 2019/0151863 A1 | 5/2019 | Corbus | |
| 2019/0299134 A1 | 10/2019 | Herman et al. | |
| 2019/0308128 A1 | 10/2019 | Brouillet et al. | |

OTHER PUBLICATIONS

International Search Report and Written Opinion dated Nov. 9, 2020, for International Application No. PCT/US2020/048548.
U.S. Non-Final office Action dated Dec. 30, 2021 issued in U.S. Appl. No. 16/948,052.
U.S. Notice of Allowance dated May 4, 2022 in U.S. Appl. No. 16/948,052.
U.S. Restriction Requirement dated Sep. 9, 2021 in U.S. Appl. No. 16/948,052.

* cited by examiner

TWO-PHASE SEPARATOR DEVICE FOR REMOVING CONDENSATE OR PARTICULATE FROM A GAS STREAM

STATEMENT REGARDING FEDERALLY SPONSORED RESEARCH OR DEVELOPMENT

Some embodiments of this invention were made with United States Government Support under Contract Nos. 80NSSC18P2185 and 80NSSC19C0208 awarded by the National Aeronautics and Space Administration (NASA). The U.S. Government has certain rights in this invention.

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates to two-phase separator devices, apparatuses, and methods for removing condensate or particulate from a gas stream, and more particularly to inertial separator devices, apparatuses, and methods for separating condensate or particulate at a low pressure drop and minimal power draw.

BACKGROUND

Humidity and temperature control are integral in many industrial applications. An air stream may include a two-phase mixture of air and water. Condensing heat exchangers are used in many industrial applications in humidity and thermal control systems. Condensing heat exchangers cool the air stream by heat removal for temperature control. For humidity control, some condensing heat exchangers may remove water directly from the air stream and some condensing heat exchangers may remove water using a water separator downstream from the condensing heat exchanger. Often, condensing heat exchangers that remove water directly from the air stream may do so by allowing condensed moisture to flow out of the condensing heat exchanger by gravity.

While air and water are ubiquitous on earth, air and water are extremely valuable in space and serve as key ingredients to life in space. Cooling air and removing excess moisture may be critical in space applications. That may allow cooled dry air to be circulated for breathing. However, humidity and temperature control may be more challenging in outer space due at least in part to operating in micro-gravity environments.

By way of an example, the International Space Station (ISS) may include a Common Cabin Air Assembly (CCAA) for humidity and temperature control. The Common Cabin Air Assembly may include a cabin heat exchanger for cooling an air stream, where the air stream may be cooled by circulating cooled water to remove excess heat. Moreover, the cabin heat exchanger may condense moisture in the air stream by using water-cooled fin surfaces over which the moisture condenses. From there, the condensed moisture and air collects into a "slurper," where the slurper removes the condensed moisture from the air stream. FIG. 1A shows a schematic illustration of a Common Cabin Air Assembly 100 including water-cooled fins 102, air fins 104, and a slurper bar ("slurper") 106. The slurper bar 106 draws air and the condensed moisture through slurper holes 108. The slurper bar 106 takes in a two-phase mixture of water and air that is then separated by a rotary separator or fan separator (not shown). The rotary separator removes water from the two-phase mixture so that cooled dry air may be circulated. FIG. 1B shows a schematic block diagram of a Common Cabin Air Assembly 100 including a slurper 106 and a water separator 110. As shown in FIG. 1B, air enters the Common Cabin Air Assembly 100 and is cooled by a humidity control heat exchanger (HX) 112, and a two-phase mixture of air and water is drawn through a slurper 106. Water is removed by a water separator or rotary separator 110 located downstream from the slurper 106.

Operation of the slurper 106 depends upon a liquid film wetting the heat exchanger 112 and slurper 106, where operation of the slurper 106 requires a hydrophilic surface. However, the presence of siloxanes and/or other chemical agents have degraded the hydrophilic surface of the heat exchanger 112 and the slurper 106, converting a hydrophilic coating to behave more hydrophobically. This causes slugs of water to pass by the slurper 106 rather than through the slurper 106, thereby going places where water is not desired. Chemical degradation of the slurper 106 occurs by surface modification of the hydrophilic surface into a hydrophobic surface via siloxanes and/or other chemical agents, resulting in inadequate performance. Ultimately, the operation of the slurper 106 and the Common Cabin Air Assembly 100 is compromised.

SUMMARY

The systems, methods and devices of this disclosure each have several innovative aspects, no single one of which is solely responsible for the desirable attributes disclosed herein.

One innovative aspect of the subject matter described in this disclosure can be implemented in a two-phase separator device. The device includes a housing having an inlet for receiving a two-phase mixture, where the two-phase mixture includes a gas stream and condensate or particulate, and a rotatable vane assembly within the housing and along a flow path of the gas stream. The rotatable vane assembly includes a rotatable drum configured to rotate about an axis of rotation along an axial direction of the two-phase separator device, a plurality of vanes arranged about the axis of rotation and extending radially outwardly from the axis of rotation to the rotatable drum, where the plurality of vanes are connected to the rotatable drum at an inner wall that is sloped.

In some implementations, the rotatable vane assembly further comprises: a motor configured to drive rotation of the rotatable drum about the axis of rotation. In some implementations, the motor is configured to drive rotation of the rotatable drum at a rotational velocity to capture all or a substantial portion of the condensate or particulate from the gas stream without redirecting the gas stream along another flow path. In some implementations, the motor is configured to drive rotation of the rotatable drum at a rotational velocity to cause acceleration of the captured condensate or particulate radially outwardly towards the inner wall and along the inner wall by centrifugal force. In some implementations, the plurality of vanes are shaped so that a rotational momentum caused by the rotation of the rotatable drum transfers to the gas stream as axial momentum. In some implementations, an inner edge of each of the plurality of vanes is connected to a central hub and an outer edge of each of the plurality of vanes is connected to the inner wall of the rotatable drum. In some implementations, the plurality of vanes, the central hub, and the rotatable drum of the rotatable vane assembly are integrated together to form a single unified body. In some implementations, a plurality of features are defined in at least a major surface of each of the plurality of vanes, the plurality of features configured to capture condensate or particulate from the gas stream. In some implementations, the plurality of features are configured to limit splashing or atomizing of the condensate or particulate when the gas stream passes through the two-phase separator device. In some implementations, a channel is defined in the rotatable drum, the channel being upstream and adjacent to an upstream lip of the rotatable drum. In some implementations, the device further includes a pitot pump positioned upstream of the upstream lip of the rotatable drum and having an opening at least partially within the channel, where the pitot pump is configured to collect the condensate or particulate accumulated in the channel of the rotatable drum, where the particulate is contained in liquid droplets using a particulate scrubber. In some implementations, the plurality of vanes are arranged as straight vanes. In some implementations, the plurality of vanes are arranged as helical vanes. In some implementations, the inner wall of the rotatable drum is sloped to promote motion of captured condensate or particulate against the flow path of the gas stream during rotation of the rotatable drum. In some implementations, the housing is stationary during rotation of the rotatable drum and surrounds the rotatable vane assembly, the rotatable vane assembly being retained within the housing of the two-phase separator device.

Another innovative aspect of the subject matter described in this disclosure can be implemented in a method of separating condensate or particulate from a gas stream. The method includes receiving a two-phase mixture of a gas stream and condensate or particulate through an inlet of a housing of a two-phase separator device, rotating a rotatable vane assembly of the two-phase separator device, where the rotatable vane assembly comprises a plurality of vanes, and flowing the gas stream through the rotatable vane assembly in an axial direction while the rotatable vane assembly is rotating, wherein condensate or particulate of the gas stream is captured by and accelerated radially outwardly along one or more of the plurality of vanes without redirecting a flow path of the gas stream.

In some implementations, the method further includes collecting the captured condensate or particulate by a pitot pump positioned adjacent to an upper lip of a rotatable drum of the rotatable vane assembly, where the particulate is contained in liquid droplets using a particulate scrubber. In some implementations, rotating the rotatable vane assembly includes rotating the plurality of vanes at a rotational velocity to cause the captured condensate or particulate to move radially outwardly along each of the plurality of vanes and along a sloped inner wall of the rotatable drum in a direction against the flow path of the gas stream. In some implementations, each of the plurality of vanes comprises a plurality of features defined in at least one major surface of the vane, the plurality of features configured to capture condensate or particulate from the gas stream. In some implementations, rotating the rotatable vane assembly includes rotating the plurality of vanes to cause a rotational momentum of the rotatable vane assembly to transfer to the gas stream as axial momentum.

BRIEF DESCRIPTION OF THE DRAWINGS

Like reference numbers and designations in the various drawings indicate like elements.

DETAILED DESCRIPTION

The present disclosure relates to a two-phase separator device for separating condensate or particulate from a gas stream. The two-phase separator device may also be referred to as a condensate separator when separating condensate or as a particulate separator when separating particulate. However, it will be understood that reference to a condensate separator may be used interchangeably with a two-phase separator device. The two-phase separator device receives a two-phase mixture of gas (e.g., air) and liquid (e.g., water) or solid (e.g., dust), and separates the liquid or solid from the gas with minimal pressure drop and power draw. A gas stream flows through the two-phase separator device along an axial flow path without being redirected in another flow path. The two-phase separator device includes a rotatable vane assembly through which the gas stream passes through, where the rotatable vane assembly is configured to rotate within a stationary housing. The two-phase separator device captures condensate or particulate by impact with one or more vanes with minimal splashing or atomizing of the condensate or particulate. In some implementations, the condensate or particulate is captured by features formed within the one or more vanes. The captured condensate or particulate is accelerated radially outwardly and in a direction against the flow path of the gas stream, where the captured condensate or particulate can be collected by a pickup device (e.g., pitot pump) located adjacent to a lip of the rotatable drum. It will be understood that while the two-phase separator device may serve to separate condensate or particulate, some implementations of the two-phase separator device may serve to separate condensate only.

Figure 1A:
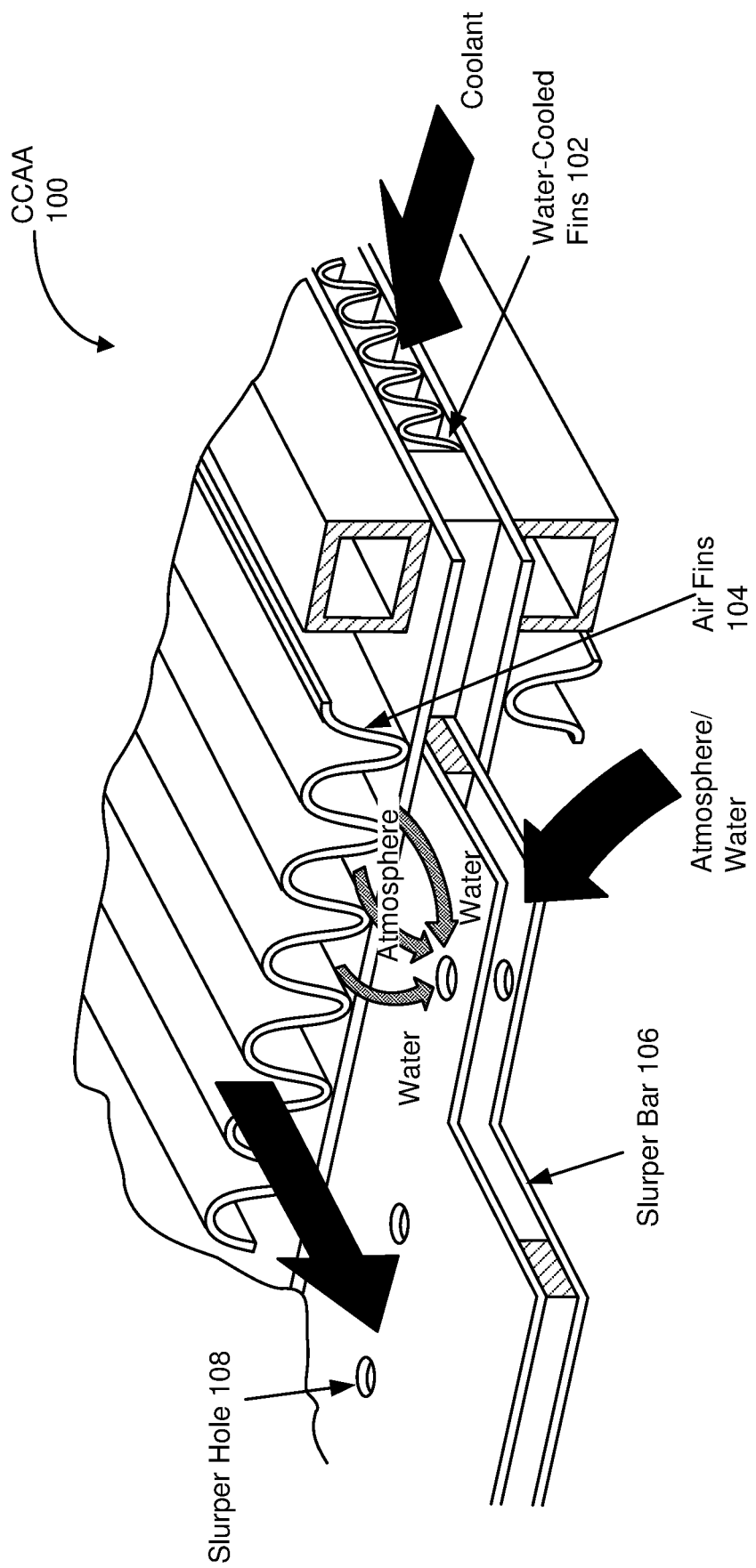
FIG. 1A shows a schematic illustration of a Common Cabin Air Assembly including water-cooled fin surfaces and a slurper.
Figure 1B:
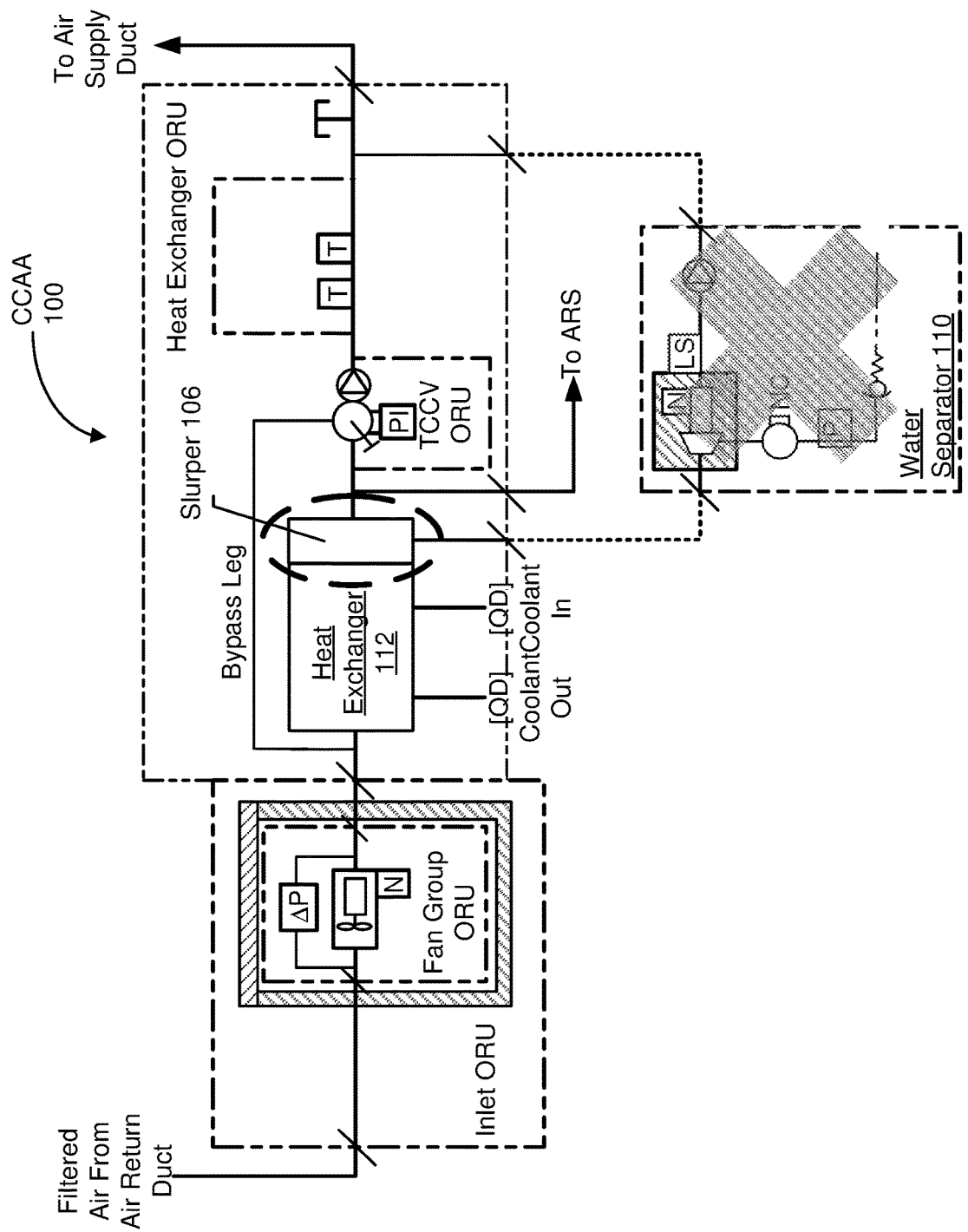
FIG. 1B shows a schematic block diagram of a Common Cabin Air Assembly including a slurper and a water separator.

In some implementations, a condensate separator of the present disclosure serves to replace a water separator and a slurper. As shown in FIG. 1B, the Common Cabin Air Assembly 100 includes: (i) a slurper 106 for drawing a two-phase mixture of air and water to a water separator 110, and (ii) a water separator 110 that separates air and water by rotary vanes. However, the condensate separator of the present disclosure replaces both the slurper 106 and the water separator 110, or at least similar components, in the Common Cabin Air Assembly 100. The condensate separator may be implemented in an assembly located downstream from a condensing heat exchanger for temperature and humidity control.

Though certain implementations of the two-phase separation device of the present disclosure are discussed in the context of space applications and/or micro-gravity environments, it will be understood that the two-phase separator device of the present disclosure may be implemented in a variety of applications. This can include but is not limited to terrestrial applications in humidification/dehumidification, evaporative cooling, oil and gas de-liquidification, and other environmental control markets. Further applications include using the two-phase separation device as a combined blower and separator, refrigeration applications, liquid-liquid separation, multi-phase separation, electronic cooling, and capture device for suspended matter.

Though aspects of the present disclosure may be discussed in the context of a water separator for separating water from an air stream, it will be understood that the present disclosure is not limited to such implementations. Rather, it will be understood that the present disclosure generally relates to liquid/condensate separation from a gas stream, or solid/particulate separation from a gas stream, with water separation from an air stream being an example.

Conventional centrifugal pumps may be utilized for inertial separation of liquid and gas through centrifugal action, and specifically for inertial separation of water and air through centrifugal action. A shaft-driven impeller rotates and moves the flow of water and air from a central location to an outer location. By way of an example, inertia may drive the heavier water against a wall for collection, allowing the lighter air to be directed elsewhere. Conventional centrifugal pumps for separating water and air receive a high volume fraction of water in the air stream, where at least about 30% of volume flow in a conventional centrifugal pump is water. In other words, conventional centrifugal pumps take in a lot of water loading. Conventional centrifugal pumps receive an air flow and redirect the flow of water and air towards the outside. Put another way, the flow of water and air is redirected from a central location to an outer location so that all of the water and air is pushed to the outer location by centrifugal force. This imposes a significant pressure drop on the flow of the air stream through the centrifugal pump.

A condensate separator of the present disclosure includes a rotatable vane assembly with a rotatable drum and a plurality of vanes. The rotatable drum and the plurality of vanes are mechanically coupled so as to rotate about an axis of rotation in tandem. The plurality of vanes capture or entrain droplets of water without atomizing them. The flow path of the air stream through the condensate separator is directed along an axial direction that is parallel to the axis of rotation. Rather than accelerating or diverting both air and water outwards, the condensate separator captures and accelerates water outwards while causing air to flow directly through without being redirected outwards. This imposes a negligible pressure drop on the flow of the air stream through the condensate separator.

Figure 2:
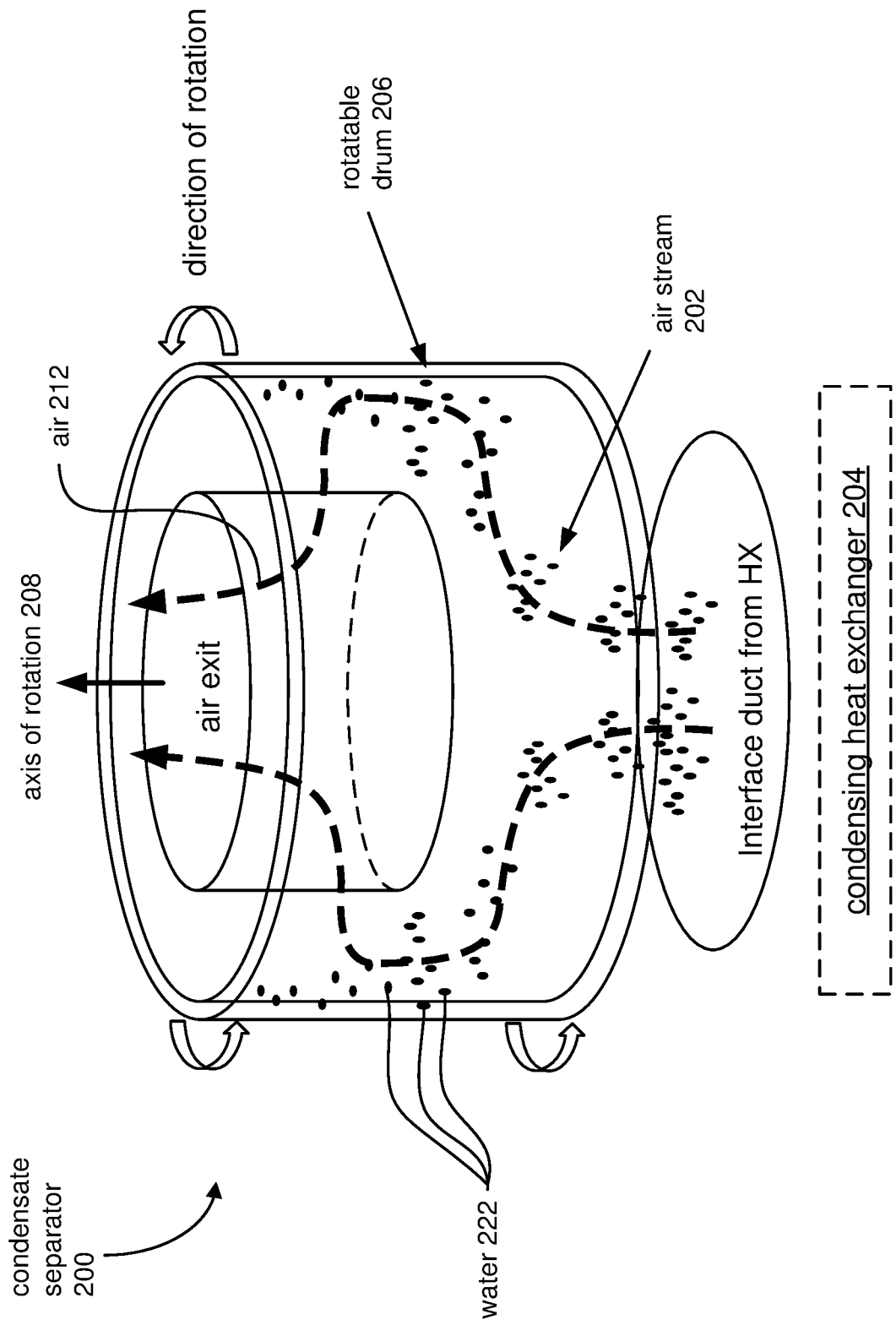
FIG. 2 shows a schematic diagram of a condensate separator showing water separation and air flow through the condensate separator according to some implementations.

FIG. 2 shows a schematic diagram of a condensate separator 200 showing water separation and air flow through the condensate separator 200 according to some implementations. The condensate separator 200 may be configured to receive an air stream 202 from a condensing heat exchanger 204 located upstream of the condensate separator 200. The air stream 202 includes a two-phase mixture of air 212 and water 222. As shown in FIG. 2, the condensate separator 200 includes a rotatable drum 206 that rotates about an axis of rotation 208 parallel to the direction of flow. Inertia causes water 22 to move radially outwards towards an outer edge of the rotatable drum 206 for collection while air 212 continues to pass through the condensate separator 200 along the direction of flow. The air 212 exits the condensate separator 200 providing cooler, dehumidified air, and the water 222 may be collected from an outer edge of the rotatable drum 206. It will be understood that the schematic diagram of the condensate separator 200 in FIG. 2 is intended to be a conceptual illustration of air flow through the condensate separator 200 and water capture at the outer edge of the rotatable drum 206. Accordingly, the schematic diagram of the condensate separator 200 in FIG. 2 is not intended to be illustrative of the mechanical components and operations of the condensate separator 200.

Contrary to conventional centrifugal pumps, the condensate separator of the present disclosure receives a low volume fraction of water in the air stream, where the volume flow of water is equal to or less than about 5%. By way of an example, the condensate separator of the present disclosure may remove between 10 mL per minute to 50 mL per minute of water for about every 200 to 800 cubic feet per minute (CFM) of air flow. In addition, the condensate separator of the present disclosure facilitates passage of air flow in an axial direction through the condensate separator without redirecting a flow path of the air flow. This allows the condensate separator to operate with a significantly low pressure drop.

The gas stream flows through a rotatable vane assembly of the condensate separator with minimal pressure drop and minimal power draw. As used herein, minimal pressure drop may refer to values equal to or less than about 1 inch $H_2O$ during operation for every 200-800 cubic feet per minute of gas flow, and minimal power draw may refer to values equal to or less than about 50 W during operation. Hydraulic power is correlated with pressure drop, where hydraulic power is directly proportional to volumetric flow and pressure drop. Reducing pressure drop through the condensate separator reduces hydraulic power.

Figure 3A:
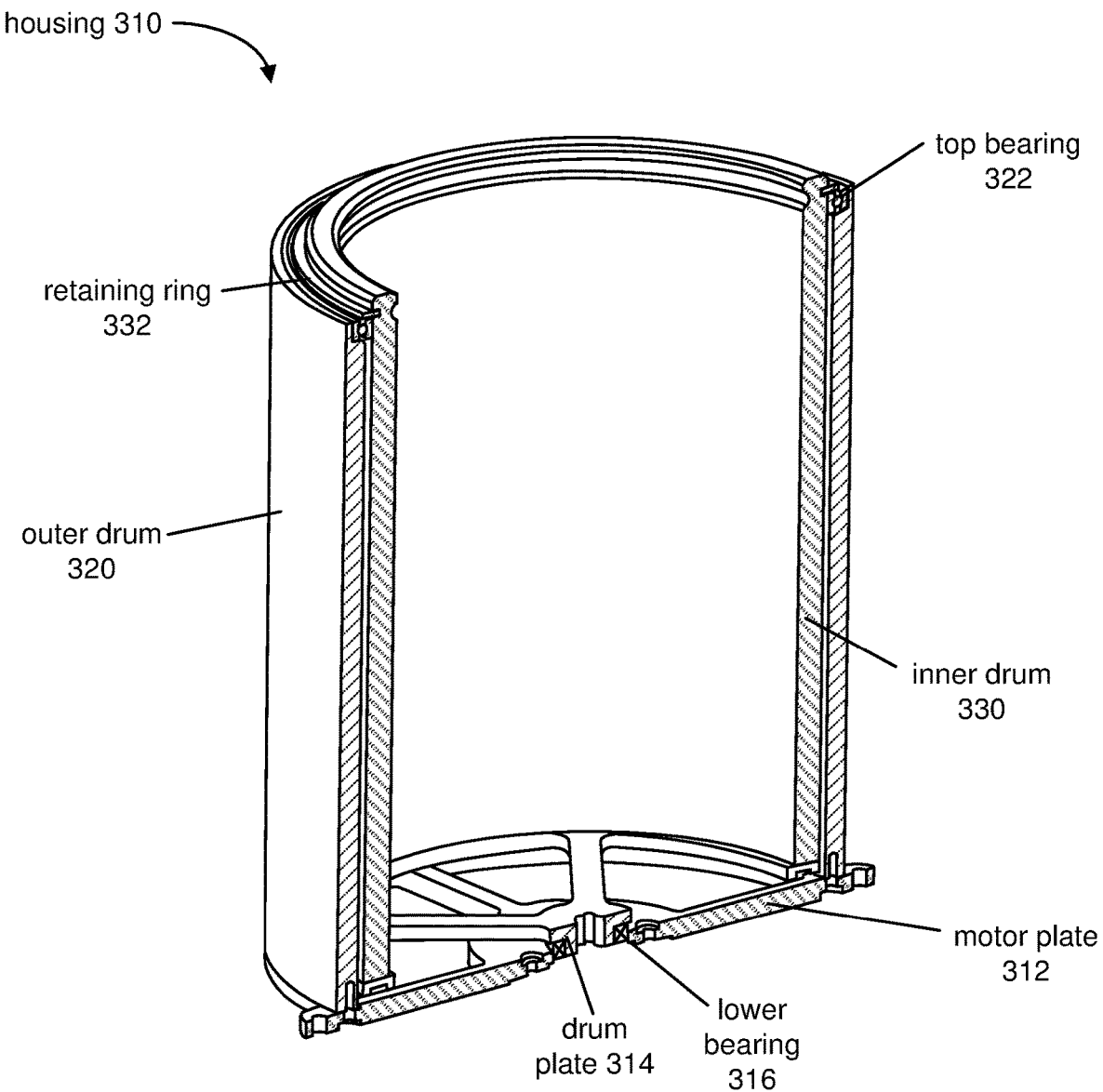
FIG. 3A shows a perspective view of a cross-sectional schematic illustration of a housing implemented in a two-phase separator device for separating condensate or particulate from a gas stream according to some implementations.
Figure 3B:
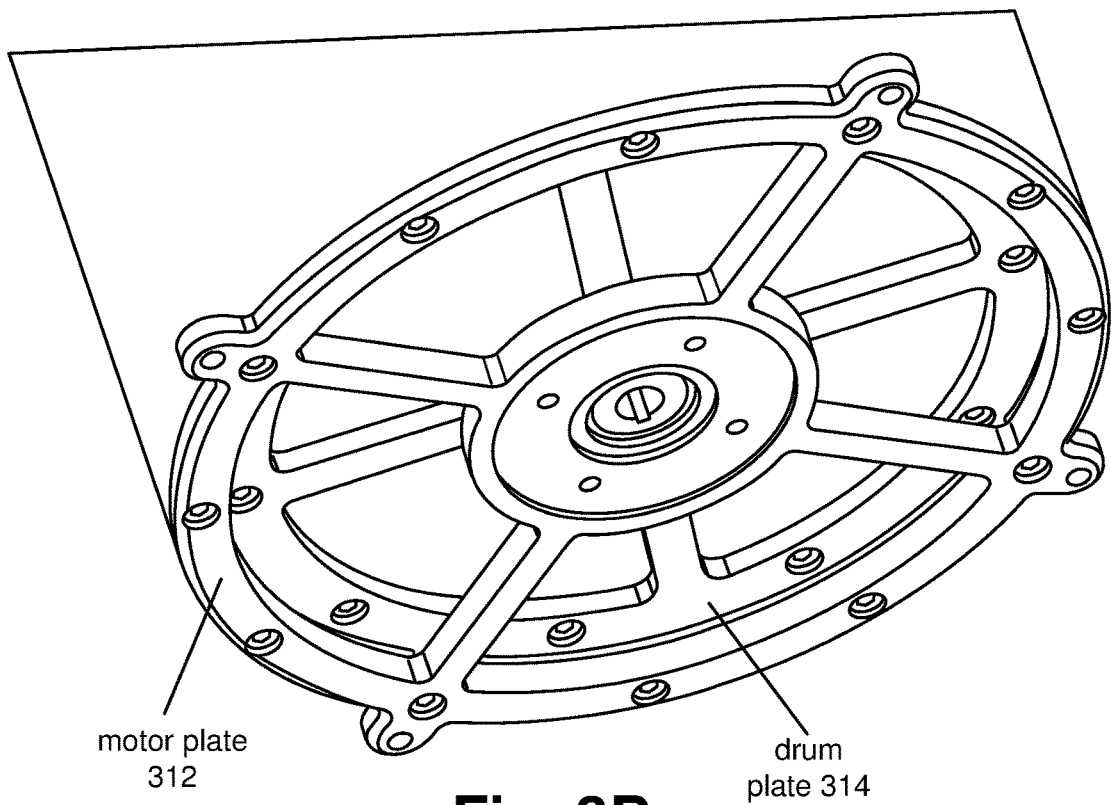
FIG. 3B shows a bottom perspective view of a schematic illustration of the housing in FIG. 3A according to some implementations.
Figure 3C:
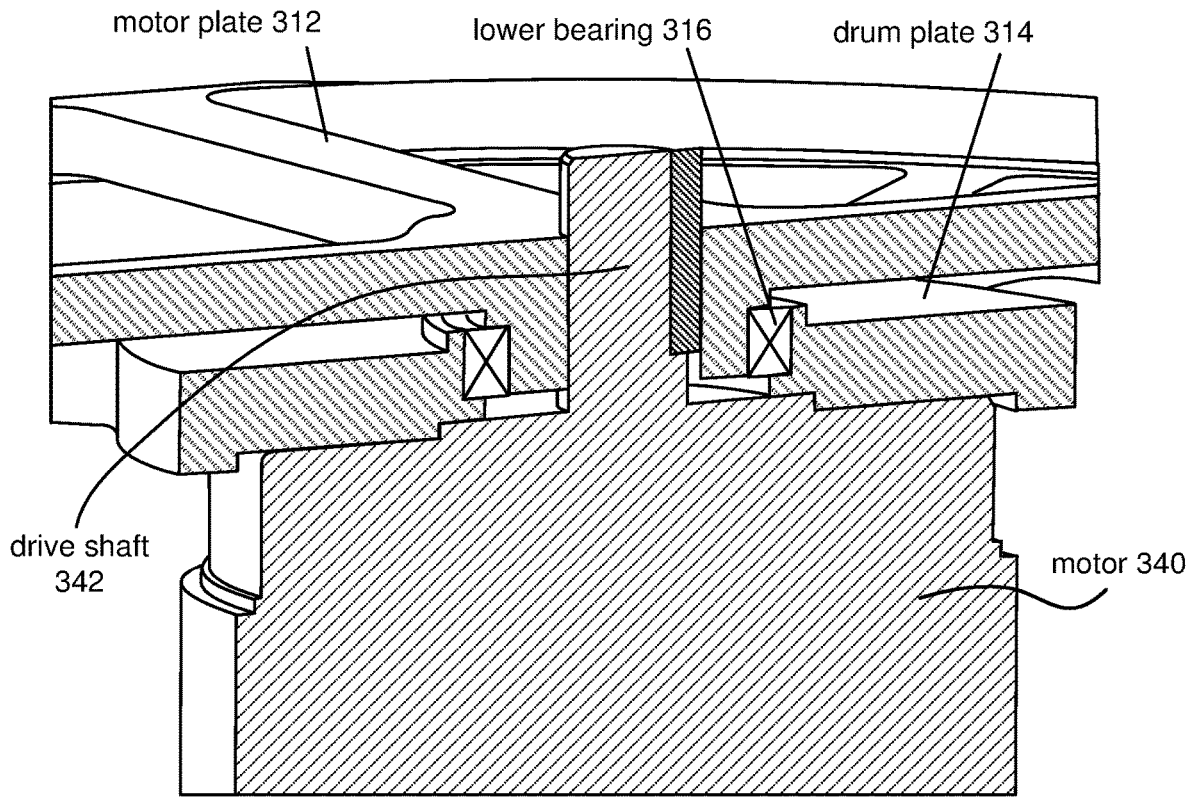
FIG. 3C shows a side view of a cross-sectional schematic illustration of a motor mounted to a motor plate in the housing in FIG. 3A according to some implementations.
Figure 3D:
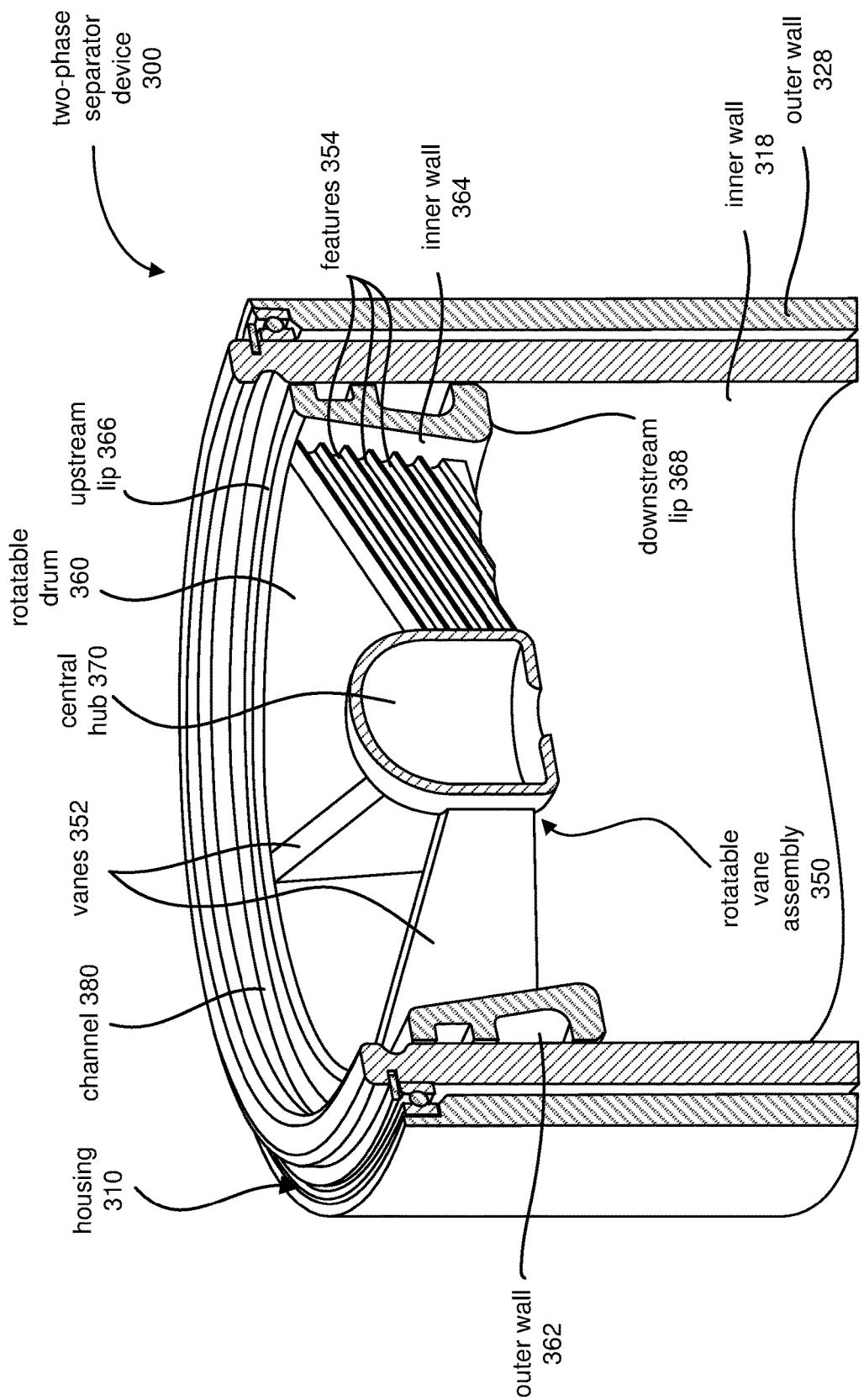
FIG. 3D shows a perspective view of a cross-sectional schematic illustration of a rotatable vane assembly disposed in the housing in FIG. 3A according to some implementations.
Figure 4A:
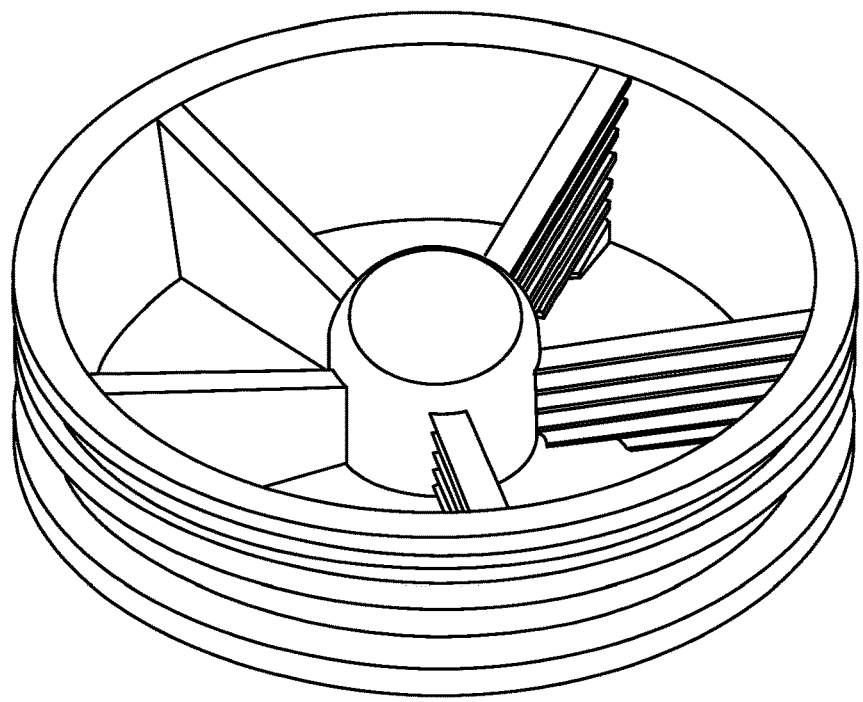
FIG. 4A shows a schematic illustration of an example rotatable vane assembly including a plurality of vanes arranged in a straight design according to some implementations.
Figure 4B:
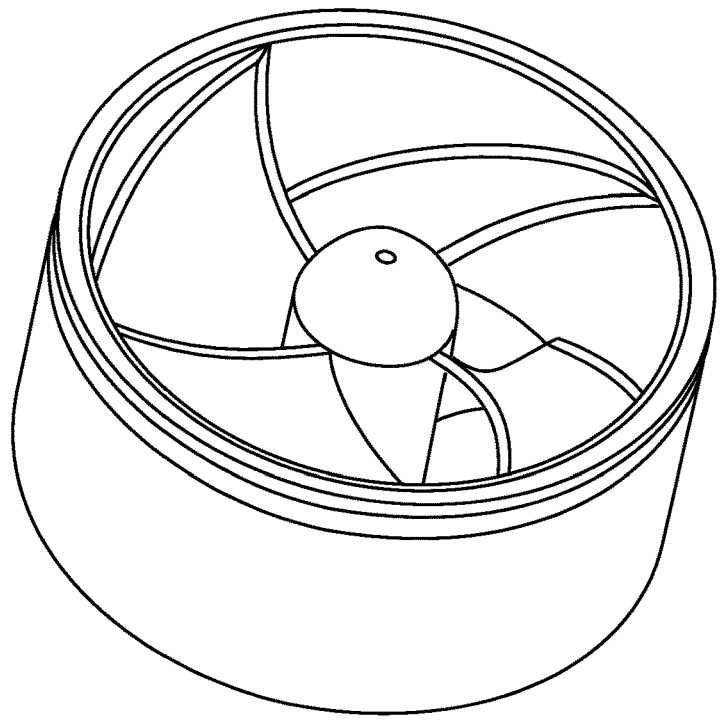
FIG. 4B shows a schematic illustration of an example rotatable vane assembly including a plurality of vanes arranged in a helical design according to some implementations.

Generally, a two-phase separator device of the present disclosure is configured to separate condensate or particulate from a gas stream. A rotatable vane assembly may be retained in a housing, where the rotatable vane assembly includes a plurality of vanes. The plurality of vanes may have features (e.g., grooves) formed therein to capture condensate or particulate. An example two-phase separator device is shown in FIGS. 3A-3D, where different views of a housing of the two-phase separator device are shown in FIGS. 3A-3C, and a perspective view of the housing and rotatable vane assembly of the two-phase separator device is shown in FIG. 3D. Examples of rotatable vane assemblies are shown in FIGS. 4A-4B, and additional examples of two-phase separator devices are shown in FIGS. 5A-5D.

FIG. 3A shows a perspective view of a cross-sectional schematic illustration of a housing 310 implemented in a two-phase separator device for separating condensate or particulate from a gas stream according to some implementations. The gas stream may flow through the housing 310, entering through an inlet (top) of the housing and exiting through an outlet (bottom) of the housing 310. As used herein, terms such as "under," "over," "below," "above," "bottom," "top," "lower," and "upper" are relative terms and may be used for ease of describing the figures, and may be used to indicate relative positions to the orientation of the figure on a properly oriented page. In some implementations, terms such as "upper," "top," and "front" may refer to positions that are upstream and terms such as "lower," "bottom," and "back" may refer to positions that are downstream. The housing 310 includes a physical structure and barrier defining an inner volume through which the gas stream flows through. The housing 310 may surround or otherwise form an outer barrier around a rotatable vane assembly as shown in FIG. 3D, where the rotatable vane assembly is retained within the housing 310. As used herein, the housing 310 may also be referred to as a casing, outer barrier, outer frame, or drum.

In some implementations, the housing 310 is cylindrical. In some implementations, the housing may be stationary during operation. As shown in FIG. 3A, the housing may include an outer drum 320 and an inner drum 330, where the outer drum 320 defines an outer wall of the housing and the inner drum 330 defines an inner wall of the housing. The inner drum 330 may be positioned within the outer drum 320. In some implementations, the inner drum 330 is configured to rotate whereas the outer drum 320 is configured to remain stationary when the inner drum 330 is rotating. The outer drum 320 may have a passage or groove formed into a top edge for a top bearing 322. A retaining ring 332 is provided in a slot formed in the inner drum 330, where the retaining ring 332 rests on the top bearing 322. That way, the inner drum 330 can rest on the outer drum 320. The inner drum 330 may be part of a rotatable vane assembly or may be configured to rotate with a rotatable vane assembly.

FIG. 3B shows a bottom perspective view of a schematic illustration of the housing 310 in FIG. 3A according to some implementations. The outer drum 320 may be mounted to a motor plate 312 at the bottom of the housing 310, and the inner drum 330 may be mounted to a drum plate 314 also at the bottom of the housing 310. The drum plate 314 may be positioned above the motor plate 312. As shown in FIGS. 3A-3C, a lower bearing 316 is disposed between the drum plate 314 and the motor plate 312, where the drum plate 314 is fitted to the lower bearing 316, and where the lower bearing 316 serves as a stabilization point for the rotating inner drum 330. In some implementations, the outer drum 320, inner drum 330, motor plate 312, and drum plate 314 may include a metallic material such as aluminum or aluminum alloy.

FIG. 3C shows a side view of a cross-sectional schematic illustration of a motor 340 mounted to the motor plate 312 in the housing 310 in FIG. 3A according to some implementations. The motor 340 is mounted to the motor plate 312 and configured to cause rotation of the inner drum 330. In some implementations, a drive shaft 342 of the motor 340 may be fitted to a matching slot in the drum plate 314. By way of an example, a motor 340 such as an Electrocraft DP680 series brush motor may be mounted to the motor plate 312 of the outer drum 320. The electromotive force provided by the motor 340 drives rotation of the inner drum 330 and/or rotational vane assembly of the two-phase separator device.

The two-phase separator device is able to separate condensate or particulate from a gas stream at a low power draw. Typically, conventional centrifugal pumps or other two-phase separator devices operate at a significantly higher power draw than the two-phase separator device of the present disclosure. For example, a conventional centrifugal pump may operate at a power draw on the order of thousands of watts (e.g., at least 1000 W). Rotational speeds of conventional centrifugal pumps during operation may be on the order of thousands of rpm (e.g., at least 5000 rpm). It will be understood that such power draws and rotational speeds will vary depending on the pump. However, the two-phase separator device of the present disclosure may operate at a power draw equal to or less than about 50 W, between about 5 W and about 50 W, or between about 10 W and about 40 W. Rotational speeds of the two-phase separator device of the present disclosure may be between about 300 rpm and about 1500 rpm, or between about 500 rpm and about 1200 rpm. Thus, the two-phase separator device can provide significant power savings.

FIG. 3D shows a perspective view of a cross-sectional schematic illustration of a rotatable vane assembly 350 disposed in the housing 310 in FIG. 3A according to some implementations. The housing 310 and the rotatable vane assembly 350 may be part of a two-phase separator device 300. The rotatable vane assembly 350 is attached, mounted, retained, mechanically coupled, or connected to an inner wall 318 of the housing 310. The rotatable vane assembly 350 includes a rotatable drum or rotatable barrier 360, where the rotatable drum 360 is disposed along the inner wall 318 of the housing 310. An outer wall 362 of the rotatable drum 360 may attach, mount, retain, mechanically couple, or connect to the inner wall 318 of the housing 310, and an inner wall 364 of the rotatable drum 360 may be faced inwardly towards a center of the two-phase separator device 300. The inner wall 364 of the rotatable drum 360 may be sloped. The rotatable vane assembly 350 includes a plurality of vanes 352 arranged about an axis of rotation that is along the axial direction of the two-phase separator device 300, where the rotatable drum 360 rotates about the axis of rotation. Each of the plurality of vanes 352 radially extends from the axis of rotation to attach, mechanically couple, or otherwise connect to the rotatable drum 360 at the inner wall 364 of the rotatable drum 360. In some implementations, each of the plurality of vanes 352 may be attached, mechanically coupled, or otherwise connected to a central hub 370 or point positioned about the axis of rotation. In some implementations, the two-phase separator device 300 further includes a motor configured to drive rotation of the rotatable drum 360 and/or the plurality of vanes 352 about the axis of rotation. In some implementations, the central hub 370 may enclose or house a motor for driving rotation of the rotatable drum 360 and/or the plurality of vanes 352 about the axis of rotation.

In some implementations, the components of the rotatable vane assembly 350 may be integrated together. For example, the plurality of vanes 352 may be integrated with the rotatable drum 360, or the plurality of vanes 352 may be integrated with the rotatable drum 360 and the central hub 370. Such integration may involve integration as a single unified body. The components may be made from the same block of material. In some implementations, each of the plurality of vanes 352, central hub 370, and rotatable drum 360 may include a metallic material such as an aluminum alloy. In some implementations, the components of the rotatable vane assembly 350 may be manufactured by 3-D printing.

In some implementations, the components of the rotatable vane assembly 350 may be assembled as separate component parts that are brought together after fabrication. For example, the plurality of vanes 352 may be fabricated as separate component parts and attached to the rotatable drum 360, or the plurality of vanes 352 may be fabricated as separate component parts and attached to the rotatable drum 360 and the central hub 370. Attachment may occur, for example, by welding, pressing, fusing, and other techniques known in the art.

In some implementations, the rotatable drum 360 may rotate in tandem with the plurality of vanes 352. This may occur where the rotatable drum 360 and the plurality of vanes 352 are integrated together. In some implementations, the rotatable drum 360 may rotate independently of the plurality of vanes 352. For example, the rotatable drum 360 may rotate at a different speed and/or direction than the plurality of vanes 352. This may occur where the rotatable drum 360 is a separate component from the plurality of vanes 352.

The motor may provide electromotive force to cause the plurality of vanes 352 to rotate in a clockwise or counter-clockwise direction about the axis of rotation. In other words, the motor may transmit torque to a shaft that causes the plurality of vanes 352 to rotate about the axis of rotation. An inner edge of each vane 352 may be connected or attached to the central hub 370 and an outer edge of each vane 352 may be connected or attached to the rotatable drum 360.

In some implementations, the geometry and number of vanes 352 may be optimized for capturing or entraining condensate or particulate in the gas stream with minimal pressure drop. In some implementations, the geometry of the vanes 352 may have a straight design as shown in FIGS. 3D and 4A, or may have a helical design as shown in FIG. 4B. In some implementations, the inner edge of each vane 352 may have an axial length that is less than an axial length of the outer edge of each vane 352. In some implementations, the axial length of the inner edge may be between about 0.5 inches and 4 inches, or between about 1 inch and about 3 inches. In some implementations, the axial length of the outer edge may be between about 1.5 inches and about 8 inches, or between about 2 inches and about 6 inches. In some implementations, the axial length of each vane 352 may taper from the outer edge to the inner edge. In some implementations, the plurality of vanes 352 may include between about 2 and 10 vanes 352, such as about two, three, four, five, six, or seven vanes 352.

Each of the vanes 352 may have major surfaces and minor surfaces, where major surfaces occupy significantly greater surface area than minor surfaces of each vane 352. In some implementations, the major surfaces are defined by the axial length and a radial length of the vanes 352, and the minor surfaces are defined by a lateral width and the radial length of the vanes 352. Generally speaking, the major surfaces of the vanes 352 make impact with droplets of condensate or particulate in a gas stream as the plurality of vanes 352 are rotated.

A plurality of features 354 may be formed or otherwise defined in at least one of the major surfaces of each of the plurality of vanes 352. Such features 354 may serve to promote capture of the condensate or particulate with minimal splashing or atomizing of the condensate or particulate. As used herein, the features 354 defined in a major surface of each vane 352 may also be referred to as trenches, divots, slots, inserts, channels, grooves, indentations, and the like. Generally, the plurality of features 354 are non-planar features defined in the vanes that arrest the liquid or solid without atomizing, and that provide a pathway for the liquid or solid to be drained away after being arrested. In some implementations, the plurality of features 354 may extend radially from the inner edge of the vane to the outer edge of the vane 352. For example, the plurality of features 354 may be arranged as rows of grooves. The rows of grooves may span across the radial length of each of the vanes 352. In some implementations, the plurality of features 354 may have a spiral shape. In some implementations, the plurality of features 354 may have a zig zag shape. In some implementations, the plurality of features 354 may be a defined as a series of divots for capturing the condensate or particulate, where the series of divots may transport the condensate or particulate to a porous substrate.

The number, sizing, and geometry of the features 354 may be optimized for capturing or entraining condensate or particulate without atomizing the condensate or particulate. For example, the features 354 may be designed to trap droplets of condensate instead of striking the droplets in a manner that would cause them to splash around or disperse into smaller beads. Thus, upon impact with the condensate, the features 354 limit splash behavior that would otherwise make it difficult to capture, accelerate, and collect the condensate. The features 354 provide an anti-splash guard to prevent loss of fluid upon impact with the condensate.

Condensate droplet size may vary, and the dimensions of the features may depend on the expected condensate droplet size in the gas stream. In some implementations, droplets of condensate may have a diameter between about 0.3 mm and about 5 mm, between about 0.5 mm and about 4 mm, or between about 0.8 mm and about 3 mm. The height and depth of the features 354 may be sized accordingly. For example, the height of each of the features 354 (e.g., grooves) may be between about 0.5 mm and about 10 mm, between about 1 mm and about 8 mm, or between about 2 mm and about 5 mm. The depth of each of the features 354 may be between about 0.5 mm and about 10 mm, between about 1 mm and about 8 mm, or between about 2 mm and about 5 mm. A longitudinal length of each of the features 354 may span the radial length of the vanes 352.

Each of the features 354 may have a suitable shape optimized for capturing or entraining condensate or particulate. In some implementations, walls of the grooves may be curved or circular in shape. In some implementations, walls of the grooves may be flat or rectangular in shape.

In some implementations, the features 354 may be sloped from the inner edge to the outer edge of each vane 352 to promote upward motion of captured droplets of condensate along the radial length of the vane 352. For example, as each of the vanes 352 may be tapered from the outer edge to the inner edge, the features 354 of a particular vane 352 may be parallel or substantially parallel to each other as well as to a top slope of the particular vane 352. Captured condensate or particulate accelerate radially outwardly towards the outer edge and in an upward direction against the flow path of the gas stream. The upward direction may be against the gravity vector in the two-phase separator device 300. The captured condensate accelerates radially outwardly and in an upward direction by centrifugal force during rotation of the plurality of vanes 352.

Not only can the capture of condensate with minimal splashing depend on the features 354 formed in the vanes 352, but the capture of condensate with minimal splashing can also depend on the rotational velocity of the plurality of vanes 352. The rotational velocity can be sufficiently slow to limit splashing but sufficiently fast to optimize condensate capture efficiency. For example, the rotational velocity of the plurality of vanes 352 may be between about 300 rpm and about 1500 rpm, between about 500 rpm and about 1200 rpm, or between about 750 rpm and about 1000 rpm. At such rotational velocities, all or a substantial portion of the condensate may be captured by the two-phase separator device 300. A substantial portion of the condensate may constitute capture efficiency equal to or greater than about 90% or equal to or greater than about 95%.

The rotational velocity of the plurality of vanes 352 provides sufficient centrifugal force to accelerate the captured condensate or particulate to be drained away towards a pickup device. Furthermore, the captured condensate or particulate is accelerated radially outwardly and in an upward/upstream direction along the inner wall 364 of the rotatable drum 360. The inner wall 364 of the rotatable drum 360 is sloped to promote acceleration of the captured condensate or particulate in an upward/upstream direction to an upstream lip 366 of the rotatable drum 360. An upstream lip 366 is positioned towards the inlet of the housing 310 and a downstream lip 368 is positioned towards the outlet of the housing 310. The sloped inner wall 364 provides a taper from a downstream lip 368 to the upstream lip 366 of the rotatable drum 360. Put another way, the inner wall 364 of the rotatable drum 360 may be sloped at an acute angle with respect to horizontal plane. This facilitates acceleration of captured condensate or particulate radially outwardly from the features 354 of a vane 352 along a sloped inner wall 364 to an upstream lip 366 of a rotatable drum 360 where the captured condensate or particulate can be collected.

The slope of the inner wall 364 may depend on the conditions of operation. Specifically, factors such as the presence of gravity or micro-gravity conditions may affect the slope of the inner wall 364, where stronger gravitational forces may necessitate lower or more horizontal slopes. Other factors such as rotational velocities may affect the slope of the inner wall 364, where slower rotational velocities may necessitate lower or more horizontal slopes. For example, where the rotational velocity is at least 500 rpm and where gravity is acting on the two-phase separator device 300, the slope of the inner wall 364 may have an acute angle of about 85 degrees or less. This can constitute a slope of 12 inches per ⅞ inches in radial extension. Where the rotational velocity is about 300 rpm and where gravity is acting on the two-phase separator device 300, the slope of the inner wall 364 may have an acute angle of about 75 degrees or less. This can constitute a slope of 4 inches per ⅞ inches in radial extension. In some implementations, the slope of the inner wall 364 has an angle that is less than about 90 degrees, such as between about 50 degrees and about 89 degrees, between about 60 degrees and about 88 degrees, or between about 70 degrees and about 87 degrees. Having the inner wall 364 sloped at a non-vertical acute angle facilitates motion of the captured condensate or particulate along the inner wall 364 during operation of the two-phase separator device 300 against the flow path of the gas stream. The motion is against the gravity vector in some instances.

As the captured condensate is accelerated radially outwardly and towards the upstream lip 366 of the rotatable drum 360, the captured condensate or particulate may accumulate at a location on the upstream lip 366 of the rotatable drum 360 or adjacent to the upstream lip 366 of the rotatable drum 360. In some implementations, the captured condensate or particulate may form a ring of condensate or particulate at the upstream lip 366 or adjacent to the upstream lip 366 of the rotatable drum 360. In some implementations, a channel 380 is formed or defined in the housing 310 or in the rotatable drum 360 in a location adjacent to the upstream lip 366 of the rotatable drum 360. The ring of condensate or particulate may accumulate in the channel 380. As used herein, the channel 380 may also be referred to as a slot, trench, feature, indentation, groove, or pitot groove. The channel 380 provides a volume for the transient storage of captured condensate as the rotatable drum 360 rotates.

In some implementations, the captured condensate or particulate may be accelerated radially outwardly to a channel 380 formed in the housing 310, such as the inner wall 318 of the housing 310, that is adjacent to the upstream lip 366 of the rotatable drum 360. Where the channel 380 is formed in the inner wall 318 of the housing 310, it will be understood that the inner wall 318 of the housing 310 rotates with the rotatable drum 360 and the outer wall 328 of the housing 310 remains stationary. Such a channel 380 is shown in FIG. 3D. In some implementations, the captured condensate or particulate may be accelerated radially outwardly to a channel formed in the rotatable drum 360 that is adjacent to the upstream lip 366 of the rotatable drum 360. Such a channel is shown in FIGS. 5A-5D. As the plurality of vanes 352 rotate during operation, condensate or particulate is captured by the features 354 to permit exit of the condensate or particulate from the vanes 352. Once the condensate or particulate moves from the vanes 352, the condensate or particulate is accelerated radially outwardly along the sloped inner wall 364 towards the upstream lip 366 of the rotatable drum 360, and then accelerated from the upstream lip 366 of the rotatable drum 360 to the channel 380 adjacent to the upstream lip 366 of the rotatable drum 360. However, it will be understood that the captured condensate or particulate may be accumulated at the upstream lip 366 of the rotatable drum 360 without moving radially outwardly further.

Captured condensate at the upstream lip 366 of the rotatable drum 360 and/or in the channel 380 adjacent to the upstream lip 366 of the rotatable drum 360 may be collected by a collecting device (not shown) such as a pitot pump or tube. It will be understood that any pickup tube or pickup device can be used in place of the pitot pump or tube. Examples of a pitot pump positioned in a channel 380 adjacent to an upstream lip 366 of a rotatable drum 360 are shown in FIGS. 5A-5D. The pitot pump may be disposed above the upstream lip 366 of the rotatable drum 360 for receiving and collecting the captured condensate, where the captured condensate can be moved by stagnation pressure. In some implementations, the pitot pump may be disposed above the upstream lip 366 of the rotatable drum 360 and at least partially within the channel 380 adjacent to the upstream lip 366, where the channel 380 is defined in the housing 310 or defined in the rotatable drum 360.

The pitot pump may be stationary during operation of the two-phase separator device 300. Specifically, the pitot pump is stationary while the rotatable drum 360 is rotating. When the captured condensate is accumulated at the upstream lip 366 or in the channel 380, the pitot pump is configured to receive captured condensate as the captured condensate rotates with the rotatable drum 360. The captured condensate may form a ring of rotating condensate at the upstream lip 366 or in the channel 380. The rotational velocity of the captured condensate impinges the pitot pump so that the pitot pump receives the captured condensate. Sufficient pressure is created to force the captured condensate out of the upstream lip 366 or channel 380 and into the pitot pump. From there, the captured condensate is collected by the pitot pump. In some implementations, particulate (e.g., dust) collection may be facilitated by particulate scrubbers or wet collectors. In particulate scrubbers, liquid is dispersed into the gas stream as a spray, and liquid droplets serve as principal collectors for the particulate. Consequently, the liquid droplets contain the particulate matter. From there, collecting particulate may follow generally the same principles as collecting condensate. Pressure at the pitot pump is produced as a function of the rotating speed of the rotatable drum 360. Factors such as rotating speed and the design of the pitot pump, including its contact radius, tube shape, flow area, and liquid depth, can affect performance of collecting the captured condensate. In some implementations, a check valve at the opening of the pitot pump may be configured to prevent condensate backflow and produce a backpressure to ensure that condensate level is sufficient to cover an opening of the pitot pump.

As the pitot pump collects captured condensate, sufficient stagnation pressure is developed in the pitot pump to move the captured condensate to a collection system. In some implementations, the collection system is a collection basin. The collected condensate may be processed by a water processing unit or water processing assembly positioned downstream from the two-phase separator device 300. The water processing assembly may be configured to treat the condensate. For example, the water processing assembly may be configured to convert contaminated water into potable water.

As the two-phase separator device 300 captures or collects condensate from the two-phase mixture, the gas stream from the two-phase mixture passes through the two-phase separator device 300 along the axial direction without being diverted. The two-phase separator device 300 may drive rotation of the rotatable drum 360 at a rotational velocity that captures all or substantially all of the condensate or particulate from the gas stream without redirecting the gas stream along another flow path. The gas stream may exit the outlet of the housing 310. In some implementations, the gas stream is an air stream that exits the two-phase separator device 300 as cooled, dehumidified air. The gas stream may pass through the two-phase separator device 300 with low pressure drop or even negative pressure drop.

As discussed above, the plurality of vanes may be shaped according to any suitable design. FIG. 4A shows a schematic illustration of an example rotatable vane assembly including a plurality of vanes arranged in a straight design according to some implementations. FIG. 4B shows a schematic illustration of an example rotatable vane assembly including a plurality of vanes arranged in a helical design according to some implementations. It will be understood that the plurality of vanes may be arranged in other geometries for optimizing the performance of the rotatable vane assembly.

The straight vane geometry as shown in FIG. 4A may provide low pressure drop and high condensate capture performance. High condensate capture performance generally occurs at high rotational velocities. The straight vane geometry may have flat or substantially flat surfaces. Though the straight vane geometry typically involves major surfaces that are vertical or substantially vertical, it will be understood that the straight vane geometry may include major surfaces that are angled.

The helical vane geometry as shown in FIG. 4B may provide moderate pressure drop and high condensate capture performance. High condensate capture performance can occur at lower rotational velocities due in part to the vane geometry. The helical vane geometry may have curved or substantially curved surfaces. The helical vane geometry may be designed with varying degrees of overlap between vanes.

The rotatable vane assembly may be able to achieve low pressure drop through the two-phase separator device. In some implementations, the low pressure drop is equal to or less than about 1 inch $H_2O$ for every 200-800 cubic feet per minute of gas flow. However, in some implementations, the rotatable vane assembly may be able to achieve negative pressure drop. In some implementations, a rotatable vane assembly having a plurality of vanes in a helical geometry can achieve such a negative pressure drop. With a negative pressure drop, the rotatable vane assembly may also be able to function as a blower. As a blower, the plurality of vanes may be shaped such that rotational momentum caused by rotation of the rotatable vane assembly is transferred to a working fluid (e.g., gas stream) as axial momentum. Generally speaking, conventional centrifugal pumps or other inertial separator devices do not function as a blower. In contrast, the two-phase separator device of the present disclosure may function simultaneously as both a condensate separator and as a blower for a gas stream. This means that blower and condensate separation functions can be combined into a single device. With a negative pressure drop, the gas stream may be blown or pulled through the two-phase separator device. The two-phase separator device may provide motive force for delivering the gas stream coming from a condensing heat exchanger located upstream of the two-phase separator device. That way, a separate blower unit may not be necessary or may operate under reduced load for delivering the gas stream to the two-phase separator device. This can provide reduced power consumption, reduced cost, and/or reduced complexity of assembly.

The two-phase separator device of the present disclosure may be able to achieve removal of a significant amount of condensate or particulate from a gas stream with minimal power draw and minimal pressure drop. The two-phase separator device facilitates gas flow through the two-phase separator device axially without diverting the gas flow in another direction. The two-phase separator device may capture condensate or particulate without atomizing or dispersing the condensate or particulate. The captured condensate or particulate may be accelerated radially outwardly and in a motion against the flow of the gas stream by centrifugal force. The two-phase separator device may be able to operate in micro-gravity conditions, meaning that the two-phase separator device can effectively separate condensate or particulate from gas even in micro-gravity conditions. The two-phase separator device may be compact and occupy a low volume.

Table 1 shows specifications of an example two-phase separator device in terms of condensate capture efficiency, power draw, pressure drop, and volume.

TABLE 1

| Parameter | Specification | Solution |
|---|---|---|
| Condensate Capture Efficiency | Removal of at least 82.1 g/min of condensate | Inertial separation using the two-phase separator device |
| Power Draw | Power consumption of less than about 44 W | Reduced RPM and motor needs via the two-phase separator device |
| Pressure Drop | Induced pressure drop of 1 inch H$_2$O or less | Low speed and large outlet diameter in the two-phase separator device |
| Volume | Occupy volume of less than about 190 L | Sized based on an upstream condensing heat exchanger |

Figure 5A:
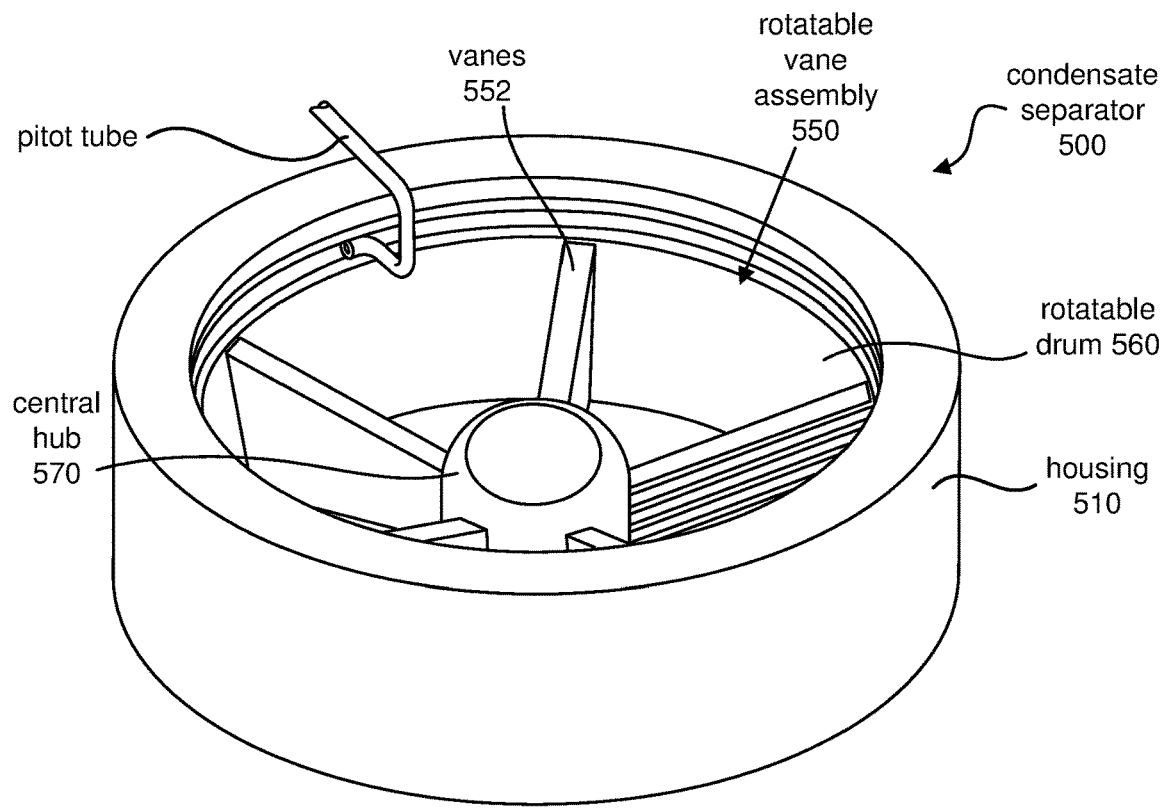
FIG. 5A shows a perspective view of a schematic illustration of an example condensate separator according to some implementations.
Figure 5B:
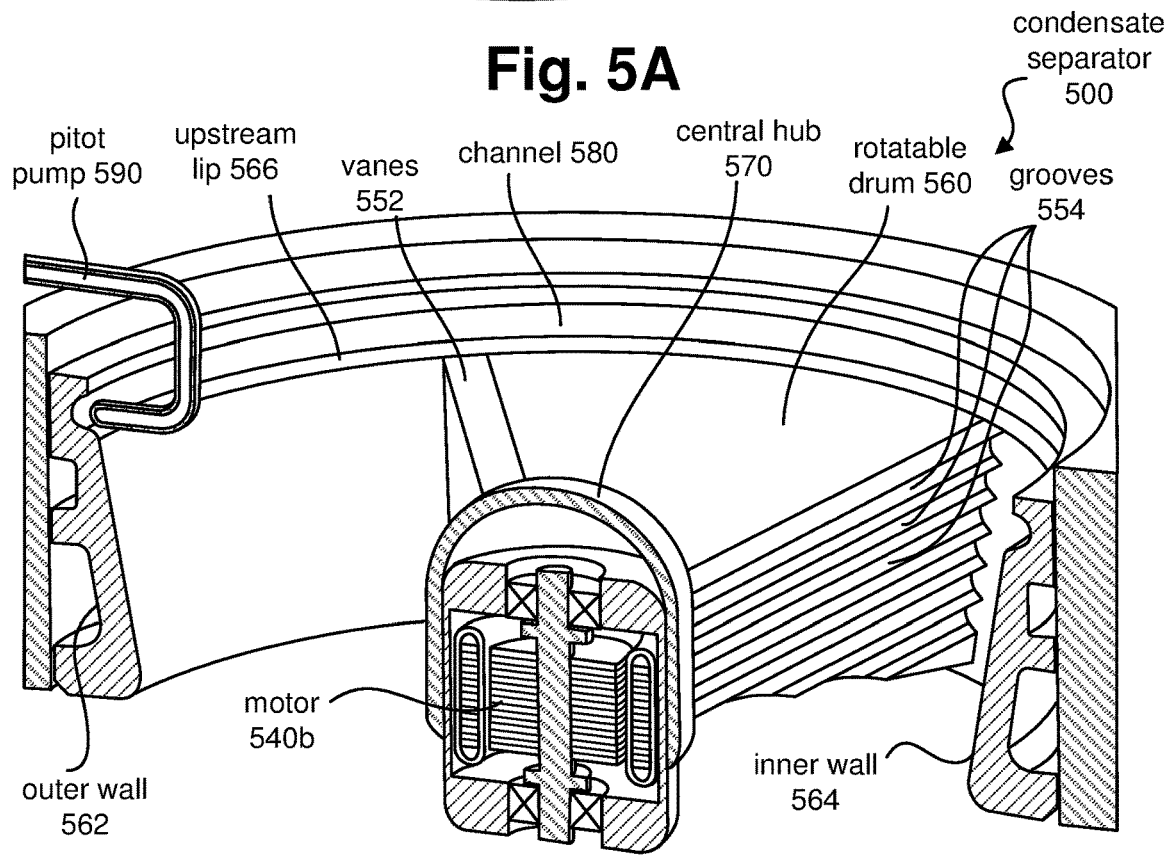
FIG. 5B shows a perspective view of a cross-sectional schematic illustration of the condensate separator of FIG. 5A according to some implementations.

FIG. 5A shows a perspective view of a schematic illustration of an example condensate separator 500 according to some implementations. FIG. 5B shows a perspective view of a cross-sectional schematic illustration of the condensate separator 500 of FIG. 5A according to some implementations. The condensate separator 500 may include a casing or housing 510, where a rotatable vane assembly 550 is retained within the housing 510. The rotatable vane assembly 550 includes a rotatable drum 560 configured to rotate about an axis of rotation along an axial direction of the condensate separator 500. A gas stream flows through the condensate separator 500 in the axial direction. The rotatable vane assembly 550 further includes a plurality of vanes 552 arranged about the axis of rotation. In some implementations, the rotatable vane assembly 550 further includes a central hub 570 centered about the axis of rotation. The plurality of vanes 552 radially extend from a central hub 570 and connect to the rotatable drum 560. Each vane 552 is connected to the rotatable drum 560 at an outer edge of the vane 552 and connected to the central hub 570 at an inner edge of the vane 552. As shown in FIG. 5A, the plurality of vanes 552 may be at least five vanes each having a straight or flat-facing geometry. As shown in FIG. 5B, the central hub 570 may enclose a motor 540b for driving rotation of the rotatable vane assembly 550.

The axial length of each of the plurality of vanes 552 may taper from the outer edge to the inner edge. A plurality of grooves 554 may be defined on at least one of the major surfaces of each of the plurality of vanes 552, where the plurality of grooves 554 extend radially outwardly along a radial length of each vane 552. The plurality of grooves 554 may be arranged as rows of grooves 554 across the major surface of the vane 552. The plurality of grooves 554 may capture droplets of condensate during rotation of the rotatable vane assembly 550.

The plurality of vanes 552 connect to the rotatable drum 560 at an inner wall 564 of the rotatable drum 560, and an outer wall 562 of the rotatable drum 560 is coupled to the housing 510. The rotatable drum 560 may be configured to rotate about the housing 510 during operation, which may be stationary. The inner wall 564 may be sloped towards an upstream lip 566 of the rotatable drum 560. A channel 580, such as a ring-shaped channel in the rotatable drum 560, is defined adjacent to and above the upstream lip 566 of rotatable drum 560. The condensate separator 500 further includes a pitot pump 590, where the pitot pump 590 is disposed above the upstream lip 566 and has an opening at least partially within the channel 580 of the rotatable drum 560. The pitot pump 590 may collect condensate accelerated radially outwardly into the channel 580 from the vanes 552.

Figure 5C:
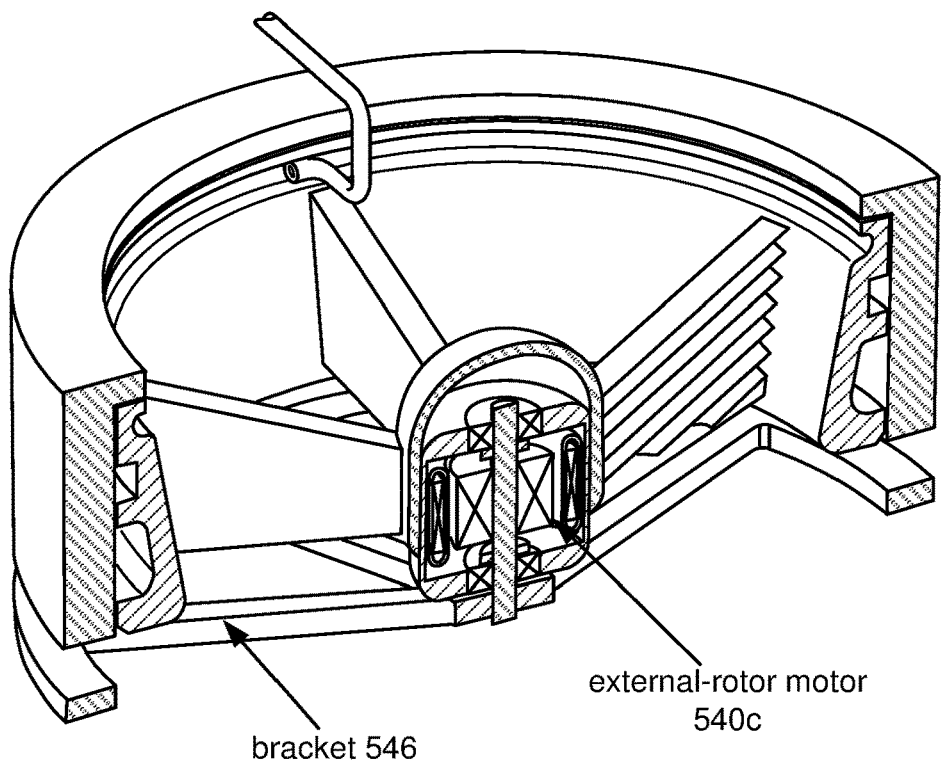
FIG. 5C shows a perspective view of a cross-sectional schematic illustration of the condensate separator of FIG. 5A including a motor that is an external-rotor motor according to some implementations.

FIG. 5C shows a perspective view of a cross-sectional schematic illustration of the condensate separator 500 of FIG. 5A including a motor 540c that is an external-rotor motor according to some implementations. A motor 540c, such as an external-rotor motor, is disposed within the central hub 570. The motor 540c may include an electromagnet and a shaft for driving the rotatable vane assembly 550. The electromagnetic is external to a stator (e.g., housing) of the condensate separator 500. Instead, the motor 540c is enclosed in a central hub 570. The shaft may be connected to a motor plate, which is coupled to the rotatable drum 560. The motor plate may include a bracket 546 through which gas flow passes through, where the bracket 546 serves to support the motor 545.

Figure 5D:
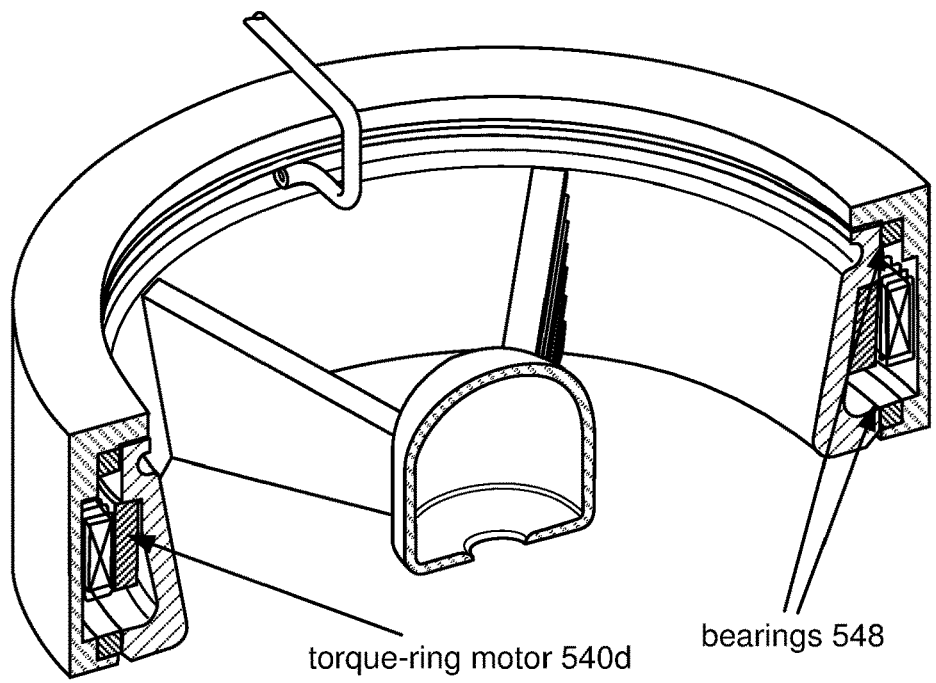
FIG. 5D shows a perspective view of a cross-sectional schematic illustration of the condensate separator of FIG. 5A including a motor that is a torque-ring motor according to some implementations.

FIG. 5D shows a perspective view of a cross-sectional schematic illustration of the condensate separator 500 of FIG. 5A including a motor 540d that is a torque-ring motor according to some implementations. A motor 540d, such as a torque-ring motor, may be integrated into an outer diameter of the rotatable vane assembly 550 with bearings 548 to support the rotatable vane assembly 550. No support bracket is necessary for the condensate separator 500 with a torque-ring motor, which can reduce pressure drop compared to a condensate separator with an external-rotor motor. The torque-ring motor may be able to apply a large torque compared to an external-rotor motor. However, the torque-ring motor may introduce more resistance compared to an external-rotor motor.

Method of Operation

Figure 6:
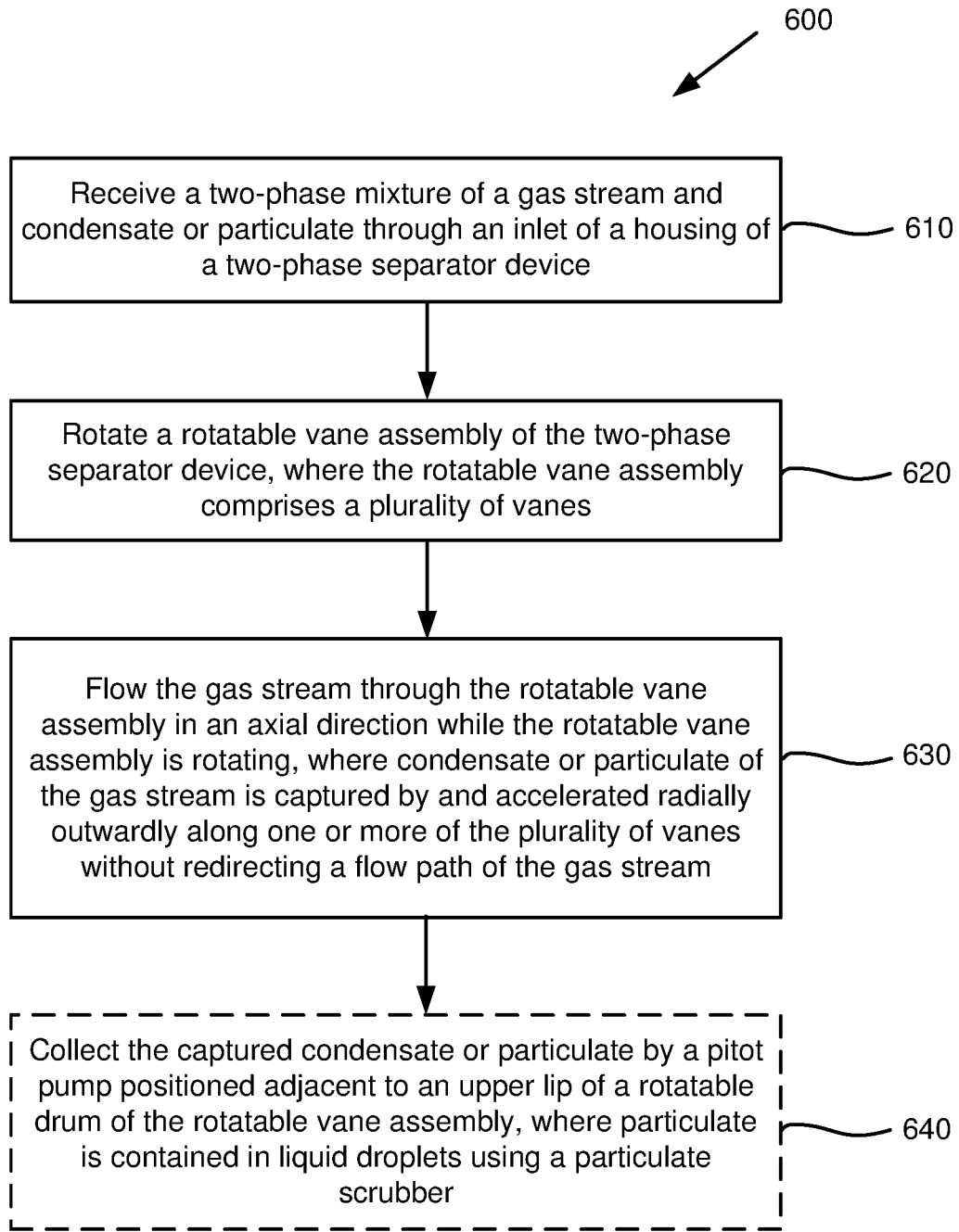
FIG. 6 is a flow diagram of an example method of separating condensate from a gas stream according to some implementations.

FIG. 6 is a flow diagram of an example method of separating condensate or particulate from a gas stream according to some implementations. The operations of process 600 may be performed in different orders and/or with different, fewer, or additional operations. The operations in the process 600 may be performed by a two-phase separator device as discussed herein. Examples of two-phase separator devices are described and shown in FIGS. 2, 3A-3D, and 5A-5D, and examples of rotatable vane assemblies in two-phase separator devices are described and shown in FIGS. 4A-4B.

At block 610 of the process 600, a two-phase mixture of a gas stream and condensate or particulate is received through an inlet of a housing of a two-phase separator device. In some implementations, the gas stream includes air and the condensate or particulate includes droplets of water. The two-phase mixture may be delivered from a condensing heat exchanger located upstream of the two-phase separator device. A blower located upstream of the two-phase separator device may push flow of the two-phase mixture towards the two-phase separator device. However, in some implementations, the two-phase separator device itself may function as a blower for drawing the two-phase mixture through the two-phase separator device.

The inlet of the housing may receive the two-phase mixture including the gas stream and the condensate/particulate. An outlet of the housing may permit the gas stream to exit the two-phase separator device, and the condensate/particulate or at least a substantial portion of the condensate/particulate is captured and collected by the two-phase separator device. A "substantial portion" of the condensate/particulate may constitute separation efficiency equal to or greater than about 95%. The gas stream may pass through the housing of the two-phase separator device in a flow path along an axial direction of the two-phase separator device without being redirected in another flow path.

At block 620 of the process 600, a rotatable vane assembly of the two-phase separator device rotates, where the rotatable vane assembly includes a plurality of vanes. The housing of the two-phase separator device may surround or otherwise form an outer barrier around the rotatable vane assembly. Accordingly, the rotatable vane assembly is retained within the housing. The rotatable vane assembly may be rotating as the two-phase mixture passes through the two-phase separator device. In some implementations, the housing of the two-phase separator device may remain stationary during rotation. The two-phase separator device includes a motor for driving rotation of the rotatable vane assembly. In some implementations, rotation of the rotatable vane assembly may have rotational speeds between about 300 rpm and about 1500 rpm, or between about 500 rpm and about 1200 rpm. In some implementations, the plurality of vanes are shaped such that rotational momentum caused by rotation of the rotatable vane assembly transfers to the gas stream as axial momentum. This effectively allows the two-phase separator device to function as a separator and a blower.

The rotatable vane assembly includes a rotatable drum configured to rotate about an axis of rotation along the axial direction of the two-phase separator device. Each vane of the plurality of vanes includes a plurality of features (e.g., grooves) defined in one of the major surfaces of the vane. Each vane may have an inner edge connected to a central hub and an outer edge connected to an inner wall of the rotatable drum. In some implementations, the rotatable drum, the plurality of vanes, and the central hub may be integrated as a single unified body. The inner wall of the rotatable drum may be sloped to direct the condensate or particulate towards a pickup device.

Rotating the rotatable vane assembly includes rotating the rotatable drum and the plurality of vanes at a rotational velocity to cause the captured condensate or particulate to move radially outwardly along a sloped inner wall of the rotatable drum in a direction against the flow path of the gas stream. In some implementations, rotating the rotatable vane assembly includes rotating the rotatable drum and the plurality of vanes at a rotational velocity to cause a negative pressure drop through the two-phase separator device.

At block 630 of the process 600, the gas stream is flowed through the rotatable vane assembly in an axial direction while the rotatable vane assembly is rotating. The condensate or particulate of the gas stream is captured and accelerated radially outwardly without redirecting a flow path of the gas stream. When the two-phase mixture encounters the rotatable vane assembly, condensate or particulate is separated out from the gas stream. The gas stream continues to flow along the flow path in the axial direction without being redirected to another flow path, thereby providing a low pressure drop across the two-phase separator device. The condensate or particulate may be captured or entrained by one or more features defined in the plurality of vanes. The one or more features may limit splashing and atomizing of the condensate or particulate. Rotation of the plurality of vanes causes the captured condensate or particulate to accelerate radially outwardly and in an upstream direction by centrifugal force. The upstream direction may be against the flow path of the gas stream and/or a gravity vector. The condensate or particulate moves radially outwardly and in the upstream direction along the inner wall of the rotatable drum, where the inner wall is sloped. The captured condensate or particulate accumulates at the upstream lip of the rotatable drum to form a ring of condensate or particulate at the upstream lip. In some implementations, the ring of condensate or particulate may be accumulated in a channel above and adjacent to the upstream lip of the rotatable drum.

At block 640 of the process 600, the captured condensate or particulate is optionally collected by a pitot pump positioned adjacent to the upstream lip of the rotatable drum of the rotatable vane assembly. Particulate may be contained in liquid droplets for capture using a particulate scrubber. The rotational velocity of the rotatable drum causes the ring of condensate or particulate to impinge an opening of the pitot pump and drive collection of condensate or particulate. The collected condensate or particulate may be gathered or stored in a basin for subsequent processing. Subsequent processing may include, for example, water processing to convert contaminated condensate into potable water. In some implementations, the pitot pump may be stationary while the rotatable vane assembly is rotating. In some implementations, the pitot pump may be positioned at least partially within the channel above and adjacent to the upstream lip of the rotatable drum.

Although the foregoing disclosed systems, methods, apparatuses, processes, and compositions have been described in detail within the context of specific implementations for the purpose of promoting clarity and understanding, it will be apparent to one of ordinary skill in the art that there are many alternative ways of implementing foregoing implementations which are within the spirit and scope of this disclosure. Accordingly, the implementations described herein are to be viewed as illustrative of the disclosed inventive concepts rather than restrictively, and are not to be used as an impermissible basis for unduly limiting the scope of any claims eventually directed to the subject matter of this disclosure.

What is claimed is:

1. A two-phase separator device, the device comprising:
    a housing that includes an inlet configured to receive a two-phase mixture comprising a gas stream and condensate, wherein the housing further includes an outlet for discharging the gas stream;
    a rotatable vane assembly within the housing and along a flow path of the two-phase mixture, the rotatable vane assembly comprising:
        a rotatable drum configured to rotate about an axis of rotation along an axial direction of the two-phase separator device, wherein a channel is formed along an inner wall of the rotatable drum;
        a central hub centered about the axis of rotation;
        a plurality of vanes arranged about the axis of rotation and extending radially outwardly from the axis of rotation to the rotatable drum, wherein the plurality of vanes are connected to the central hub at an inner edge of each of the vanes and connected to the inner wall of the rotatable drum at an outer edge of each of the vanes; and
    a pickup tube having an opening at least partially disposed within the channel, wherein the pickup tube is configured to collect the condensate that accumulates in the channel of the rotatable drum.

2. The two-phase separator device of claim 1, wherein the pickup tube comprises a pitot pump positioned adjacent to an upper lip of the rotatable drum.

3. The two-phase separator device of claim 1, wherein the pickup tube is configured to be stationary when the rotatable drum rotates about the axis of rotation.

4. The two-phase separator device of claim 1, wherein the plurality of vanes are configured to capture the condensate from the gas stream.

5. The two-phase separator device of claim 4, wherein the plurality of vanes are further configured to cause the captured condensate to accelerate radially outwardly towards the channel of the rotatable drum.

6. The two-phase separator device of claim 5, wherein the captured condensate forms a ring of condensate in the channel when the rotatable drum rotates about the axis of rotation.

7. The two-phase separator device of claim 5, wherein a plurality of non-planar features are formed in at least a major surface of each of the plurality of vanes, wherein the captured condensate accelerates radially outwardly along the non-planar features to the channel formed along the inner wall of the rotatable drum.

8. The two-phase separator device of claim 7, wherein the plurality of non-planar features comprise a plurality of grooves configured to limit splashing or atomizing the condensate when the gas stream passes through the housing of the two-phase separator device.

9. The two-phase separator device of claim 1, wherein the plurality of vanes are configured to capture the condensate from the gas stream without redirecting the gas stream to another flow path.

10. The two-phase separator device of claim 1, wherein the plurality of vanes, the central hub, and the rotatable drum of the rotatable vane assembly are integrated together to form a single unified body.

11. The two-phase separator device of claim 1, wherein the plurality of vanes are arranged as straight vanes.

12. The two-phase separator device of claim 1, wherein the plurality of vanes are arranged as helical vanes.

13. The two-phase separator device of claim 1, wherein the rotatable vane assembly further comprises a motor configured to drive rotation of the rotatable drum about the axis of rotation, wherein the motor is configured to drive rotation at a sufficient rotational velocity to cause sufficient pressure to force the condensate into the pickup tube for collection.

14. The two-phase separator device of claim 1, wherein the two-phase separator device is configured to collect at least 95% of the condensate from the gas stream in the two-phase mixture when the gas stream is discharged from the housing.

15. The two-phase separator device of claim 1, wherein the housing is stationary during rotation of the rotatable drum and surrounds the rotatable vane assembly, the rotatable vane assembly being retained within the housing of the two-phase separator device.

* * * * *